US011859454B1

(12) United States Patent
Batarseh

(10) Patent No.: US 11,859,454 B1
(45) Date of Patent: Jan. 2, 2024

(54) ACOUSTIC SHALE SHAKER

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/077,976

(22) Filed: Dec. 8, 2022

(51) Int. Cl.
E21B 21/06 (2006.01)
B01D 33/03 (2006.01)
B01D 33/80 (2006.01)

(52) U.S. Cl.
CPC ............ *E21B 21/065* (2013.01); *B01D 33/03* (2013.01); *B01D 33/80* (2013.01)

(58) Field of Classification Search
CPC ........ E21B 21/065; B01D 33/03; B01D 33/80
USPC ...................................................... 209/12.1
See application file for complete search history.

(56) References Cited

U.S. PATENT DOCUMENTS

| 7,278,540 | B2 | 10/2007 | Stone et al. | |
| 7,571,817 | B2 | 8/2009 | Scott et al. | |
| 8,561,805 | B2 | 10/2013 | Scott et al. | |
| 10,633,941 | B2 | 4/2020 | Teodorescu | |
| 2006/0011520 | A1* | 1/2006 | Schulte ................ | B01D 33/033 209/309 |
| 2008/0223760 | A1 | 9/2008 | Vasshus et al. | |
| 2015/0007652 | A1* | 1/2015 | Goodwin .............. | E21B 47/107 73/152.58 |
| 2017/0175464 | A1* | 6/2017 | Cooke .................. | B01D 21/283 |

FOREIGN PATENT DOCUMENTS

| CA | 2421224 | A1 | * | 3/2003 | | |
| CN | 206052520 | U | * | 3/2017 | | |
| JP | 2018505437 | A | * | 2/2018 | | |
| NO | 337854 | B1 | * | 7/2016 | ............ | E21B 47/01 |
| WO | WO-2006098638 | A1 | * | 9/2006 | ............ | B01D 33/03 |
| WO | WO-2007004889 | A1 | * | 1/2007 | .......... | B01D 33/048 |
| WO | WO-2014147625 | A1 | * | 9/2014 | ............ | H04R 17/00 |

\* cited by examiner

Primary Examiner — Terrell H Matthews
(74) Attorney, Agent, or Firm — Fish & Richardson P.C.

(57) ABSTRACT

An apparatus can be used to separate drill cuttings from drilling fluid. The apparatus includes a receptacle, a screen, acoustic transducers, and a collection pan. The receptacle is configured to receive a mixture of the drill cuttings and the drilling fluid. The receptacle is configured to distribute the mixture of the drill cuttings and the drilling fluid across a first end of the screen. The acoustic transducers are attached to the screen. The acoustic transducers are configured to generate acoustic vibrations in a range of frequencies. The generated acoustic vibrations facilitate travel of the mixture across the screen and cause the drill cuttings to separate as the mixture travels across the screen. The collection pan is positioned at a second end of the screen opposite the receptacle. The collection pan is configured to receive at least a portion of the drill cuttings that have traveled across the screen.

15 Claims, 3 Drawing Sheets

ACOUSTIC SHALE SHAKER

TECHNICAL FIELD

This disclosure relates to shale shakers.

BACKGROUND

Drilling fluids are used in oil and gas drilling to assist with lubricating the drill bit, ensuring well safety, forming filter cakes to minimize fluid loss into drilling formations, and transporting drill cuttings (such as rock debris) to the surface of the well. As such, drilling fluids are integral to the drilling process. Drilling fluids can include a mixture of various chemicals in a water- or oil-based solution and can be expensive to make. For both environmental reasons and economical reasons, drilling fluid losses can be reduced by stripping drilling fluid away from drill cuttings, so that the drilling fluid can be recovered and reused in the drilling process. The drill cuttings separated from the drilling fluid can be analyzed to determine characteristics of the well.

SUMMARY

This disclosure describes technologies relating to an acoustic shale shaker that can separate drilling fluid from drill cuttings and can sort drill cuttings based on characteristics of the drill cuttings, such as density. Certain aspects of the subject matter described can be implemented as an apparatus for separating drill cuttings from drilling fluid. The apparatus includes a receptacle, a screen, acoustic transducers, and a collection pan. The receptacle is configured to receive a mixture of the drill cuttings and the drilling fluid. The receptacle is positioned at a first end of the screen. The receptacle is configured to distribute the mixture of the drill cuttings and the drilling fluid across the first end of the screen. The acoustic transducers are attached to the screen. The acoustic transducers are configured to generate acoustic vibrations in a range of frequencies. The generated acoustic vibrations facilitate travel of the mixture across the screen and cause the drill cuttings to separate as the mixture travels across the screen. The collection pan is configured to receive at least a portion of the drill cuttings that have traveled across the screen. The collection pan is positioned at a second end of the screen opposite the receptacle.

This, and other aspects, can include one or more of the following features. At least one acoustic transducer of the plurality of acoustic transducers can be configured to generate acoustic vibrations having a frequency that is different from the acoustic vibrations generated by a remainder of the plurality of acoustic transducers. Each acoustic transducer of the plurality of acoustic transducers can be configured to generate acoustic vibrations having variable frequencies varying from 1 kilohertz to 10 gigahertz. While operating, the collection pan can be positioned below the receptacle, such that the screen extending from the receptacle to the collection pan deviates from a horizontal with respect to gravity by a degree in a range of from about 1° to about 5°. The collection pan can be a first collection pan of a plurality of collection pans. The plurality of collection pans can be distributed side-by-side across the second end of the screen. For each pair of neighboring collection pans of the plurality of collection pans, the apparatus can include a plate positioned intermediate of the respective neighboring collection pans. Each plate can be configured to direct different portions of the drill cuttings into the respective neighboring collection pans.

Certain aspects of the subject matter described can be implemented as a method for separating drill cuttings from drilling fluid. A receptacle positioned at a first end of a screen directs a mixture of the drill cuttings and the drilling fluid onto the screen. Acoustic transducers attached to the screen generate acoustic vibrations having a range of frequencies to facilitate travel of the mixture across the screen. The acoustic vibrations generated by the acoustic transducers separate the drill cuttings as the mixture travels across the screen. A first collection pan positioned at a second end of the screen opposite the receptacle receives a first portion of the drill cuttings that have traveled across the screen. A second collection pan positioned at the second end of the screen opposite the receptacle receives a second portion of the drill cuttings that have traveled across the screen.

This, and other aspects, can include one or more of the following features. At least one acoustic transducer of the plurality of acoustic transducers can generate acoustic vibrations having a frequency that is different from the acoustic vibrations generated by a remainder of the plurality of acoustic transducers. Each acoustic transducer of the plurality of acoustic transducers can generate acoustic vibrations having variable frequencies varying from 1 kilohertz to 10 gigahertz. The first and second collection pans can be positioned below the receptacle, such that the screen extending from the receptacle to the first and second collection pans deviates from a horizontal with respect to gravity by a degree in a range of from about 1° to about 5°. The first and second collection pans can be distributed side-by-side across the second end of the screen. A plate can be positioned intermediate of the first and second collection pans. The plate can direct the first portion of the drill cuttings to the first collection pan. The plate can direct the second portion of the drill cuttings to the second collection pan.

Certain aspects of the subject matter described can be implemented as a system. The system includes a flow-out line and a shale shaker. The flow-out line is configured to flow a mixture of drill cuttings and drilling fluid from a wellbore to the shale shaker. The shale shaker includes a receptacle, a screen, acoustic transducers, and collection pans. The receptacle is configured to receive the mixture of the drill cuttings and the drilling fluid from the flow-out line. The receptacle is positioned at a first end of the screen. The receptacle is configured to distribute the mixture of the drill cuttings and the drilling fluid across the first end of the screen. The acoustic transducers are attached to the screen. The acoustic transducers are configured to generate acoustic vibrations in a range of frequencies. The generated acoustic vibrations facilitate travel of the mixture across the screen and cause the drill cuttings to separate as the mixture travels across the screen. The collection pans are positioned at a second end of the screen opposite the receptacle. The collection pans are distributed side-by-side across the second end of the screen. Each collection pan is configured to receive a different portion of the drill cuttings that have traveled across the screen.

This, and other aspects, can include one or more of the following features. At least one acoustic transducer of the plurality of acoustic transducers can be configured to generate acoustic vibrations having a frequency that is different from the acoustic vibrations generated by a remainder of the plurality of acoustic transducers. Each acoustic transducer of the plurality of acoustic transducers can be configured to generate acoustic vibrations having variable frequencies varying from 1 kilohertz to 10 gigahertz. While operating, the collection pans can be positioned below the receptacle, such that the screen extending from the receptacle to the collection pans deviates from a horizontal with respect to gravity by a degree in a range of from about 1° to about 5°. For each pair of neighboring collection pans of the plurality of collection pans, the shale shaker can include a plate positioned intermediate of the respective neighboring collection pans. Each plate can be configured to direct different portions of the drill cuttings into the respective neighboring collection pans.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes an acoustic shale shaker for separating drill cuttings. The acoustic shale shaker includes a receptacle, a screen, acoustic transducers, plates, and collection pans. Drill cuttings and drilling fluid are collected into the receptacle and then transferred from the receptacle onto the screen. The acoustic transducers generate acoustic vibrations at a range of different frequencies to separate the drill cuttings by density. The plates help the separation process and also direct the separated drill cuttings into the individual collection pans. In some cases, the screen is tilted to facilitate separation of the drill cuttings and movement toward the collection pans. Each individual collection pan includes drill cuttings of similar density. The cuttings that have been distributed and separated into the different collection pans can be analyzed to determine characteristics of the subterranean formation from which the drill cuttings originated and for the presence and composition of hydrocarbons.

The subject matter described in this disclosure can be implemented in particular implementations, so as to realize one or more of the following advantages. The apparatuses, systems, and methods described here can be implemented to separate drill cuttings based on their physical characteristics (such as density, size, and/or volume), such that drill cuttings having similar properties can be analyzed together. For example, the apparatuses described include acoustic transducers that are configured to generate acoustic vibrations having a range of frequencies, which can cause similar drill cuttings to aggregate, thereby facilitating the drill cuttings separation process. The separation of drill cuttings based on characteristics can facilitate the analysis of the subterranean formation from which the drill cuttings originated. The drilling fluid that has been stripped from the drill cuttings can be recovered and reused in the drilling process to minimize drilling fluid losses.

Figure 1:
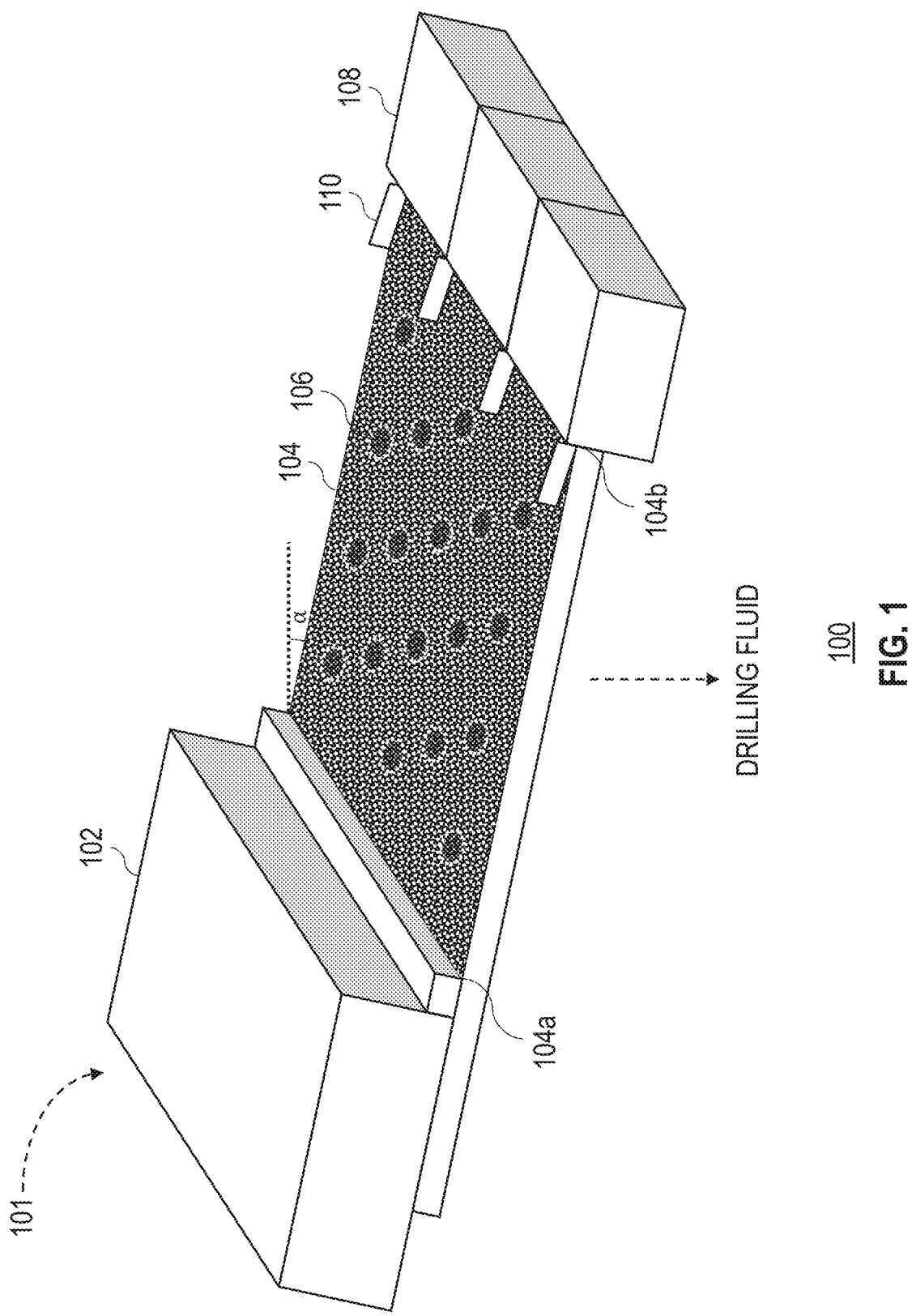
FIG. 1 is a schematic diagram of an example shale shaker.

FIG. 1 is a schematic diagram of an example shale shaker 100. The shale shaker 100 is configured to separate drill cuttings from drilling fluid. The shale shaker 100 includes a receptacle 102, a screen 104, acoustic transducers 106, and collection pans 108. The receptacle 102 is configured to receive a mixture 101 of drill cuttings and drilling fluid, for example, from the annulus of the wellbore. In some implementations, the screen 104 is adjustable, such that the screen 104 can be rotated and/or tilted to facilitate travel of the mixture 101 across the screen 104 and separation of the mixture 101. For example, the shale shaker 100 can include a motor coupled to the screen 104, and the motor can adjust a position/angle of the screen 104 as desired.

The receptacle 102 is positioned at a first end 104a of the screen 104. The screen 104 can have, for example, a square shape or a rectangular shape. The first end 104a and the second end 104b of the screen 104 can be opposite sides of the square or rectangular screen 104. In some implementations, the receptacle 102 includes a feeder (such as a weir feeder) that evenly distributes the mixture of drill cuttings and drilling fluid along the entire width of the first end 104a of the screen 104. The receptacle 102 is configured to distribute the mixture of drill cuttings and drilling fluid across the first end 104a (for example, the width) of the screen 104.

The acoustic transducers 106 are attached to the screen 104. For example, the acoustic transducers 106 are in physical contact with a bottom side of the screen 104, such that the acoustic transducers 106 can impart vibrations to the screen 104 without impeding travel of the mixture 101 across the top side of the screen 104. The acoustic transducers 106 are configured to generate acoustic vibrations in a range of frequencies. The acoustic vibrations generated by the acoustic transducers 106 cause the screen 104 to vibrate, thereby facilitating the mixture of drill cuttings and drilling fluid to travel laterally across the length of the screen 104 (for example, in a general direction from the first end 104a to the second end 104b). The acoustic vibrations generated by the acoustic transducers 106 can cause the drill cuttings to separate, for example based on characteristics (such as density), as the mixture travels across the screen 104.

In some implementations, the screen 104 is a solid plate, and the mixture 101 travels across the top side of the solid plate while the acoustic transducers 106 coupled to the bottom side of the solid plate generate acoustic vibrations of varying frequencies. In some implementations, the screen 104 defines holes that are sized to allow the drilling fluid and drill cuttings of a specified size to fall through the screen 104 via the holes. The screen 104 can define holes that are uniform in size or varying in size. In some implementations, the screen 104 defines holes having an opening size in a range of from about 100 micrometers to about 6,000 micrometers. In some cases, substantially all of the drilling fluid falls through the screen 104 via the holes, while drill cuttings that are too large to fall through the screen 104 via the holes travel across the screen 104. The drilling fluid that falls through the screen 104 via the holes can, for example, be recovered and re-used in drilling operations. The acoustic vibrations generated by the acoustic transducers 106 facilitate travel of the drill cuttings laterally across the screen 104. The acoustic vibrations generated by the acoustic transducers 106 can facilitate the drill cuttings that are smaller than the holes of the screen 104 to fall through the screen 104 via the holes.

The acoustic transducers 106 use electricity to generate acoustic vibrations. For example, the acoustic transducers 106 can include piezoelectric material that can convert electricity into acoustic vibration. In some implementations, the acoustic transducers 106 are configured to generate acoustic vibrations having variable (that is, adjustable) frequencies varying from 1 kilohertz to 10 gigahertz. For example, each acoustic transducer 106 is tunable and can generate acoustic vibrations that can vary in frequency in a range of from 1 kilohertz to 10 gigahertz, and the frequencies of the generated acoustic vibrations can be adjusted based on particular needs. In some implementations, at least one of the acoustic transducers 106 is configured to generate acoustic vibrations having a frequency that is different from the acoustic vibrations generated by a remainder of the acoustic transducers 106. In some implementations, each of the acoustic transducers 106 is configured to generate acoustic vibrations having a different frequency (that is, each acoustic transducer 106 generates an acoustic vibration having a different frequency from the acoustic vibration generated from another acoustic transducer 106). As one example, a first acoustic transducer can generate an acoustic vibration having a frequency of 10 kilohertz, a second acoustic transducer can generate an acoustic vibration having a frequency of 100 kilohertz, and a third acoustic transducer can generate an acoustic vibration having a frequency of 1 gigahertz. The acoustic transducers 106 can be made of, for example, quartz or a different piezoelectric material, such as crystalline materials, ceramics, semiconductors, or polymers. Including multiple acoustic transducers 106 that simultaneously generate acoustic vibrations of different frequencies can facilitate separation of dissimilar drill cuttings and can also facilitate congregation of similar drill cuttings. For example, the acoustic vibrations generated by the acoustic transducers 106 can have different frequencies, which can cause drill cuttings having similar properties (for example, density and/or composition) to congregate/aggregate while separating from drill cuttings having dissimilar properties.

The collection pans 108 are positioned at a second end 104b of the screen 104 that is opposite the receptacle 102. That is, the receptacle 102 and the collection pans 108 are positioned at opposite ends of the screen 104. In some implementations, the receptacle 102 is coupled to the first end 104a of the screen 104, and the collection pans 108 are coupled to the second end 104b of the screen 104. During operation of the shale shaker 100, the collection pans 108 can be positioned below the receptacle 102, such that the screen 104 extending from the receptacle 102 to the collection pans 108 deviates from a horizontal (reference horizontal dotted line in FIG. 1) with respect to gravity. In some implementations, the screen 104 deviates from the horizontal by a degree (a) in a range of from about 1° to about 5°. The collection pans 108 are configured to receive at least a portion of the drill cuttings that have traveled across the screen 104. In some implementations, as shown in FIG. 1, the shale shaker 100 includes multiple collection pans 108 that are distributed side-by-side across the second end 104b of the screen 104. Although shown in FIG. 1 as including three collection pans 108, the shale shaker 100 can include fewer (for example, one or two) or additional (for example, four, five, or more than five) collection pans 108. In some implementations, the shale shaker 100 includes, for each pair of neighboring collection pans 108, a plate 110 positioned intermediate of the respective neighboring collection pans 108. Each plate 110 can be configured to facilitate separation of drill cuttings into the respective neighboring collection pans 108. The plate(s) 110 can direct the drill cuttings to the collection pan(s) 108. The inclusion of multiple collection pans 108 can be useful in collecting drill cuttings having similar properties in each collection pan. For example, the acoustic transducers 106 generating acoustic vibrations of different frequencies can cause the drill cuttings to separate based on properties, and similar drill cuttings can congregate and be directed into a particular collection pan 108 while other drill cuttings are directed to one or more different collection pans 108.

The drill cuttings collected by the collection pans 108 can be analyzed to determine characteristics of the subterranean formation in which the wellbore has been formed and from which the drill cuttings have originated. For example, the drill cuttings collected by the collection pans 108 can be analyzed to determine the presence and/or composition of hydrocarbons. The drilling fluid and/or the drill cuttings that have separated from the mixture 101 and fallen through the holes of the screen 104 can be collected, for example, in a settling pit positioned below the screen 104 (such as the settling pit 236). The drilling fluid from the settling pit 236 can be transferred to the suction pit 238. The drilling fluid then be flowed back into the wellbore by the fluid pump 230, for example, to be re-used to drill deeper into the subterranean formation. In some implementations, at least a portion of the drill cuttings collected by the collection pans 108 can be recycled to the receptacle 102 for further separation. For example, the drill cuttings of the mixture 101 can be separated into the collection pans 108 while the acoustic transducers 106 generate acoustic vibrations having a frequency of about 8.5 kilohertz, and then a portion of the drill cuttings from the collection pans 108 can be re-processed by the apparatus 100 (and the collection pans 108 emptied) to be separated into the collection pans 108 while the acoustic transducers 106 generate acoustic vibrations with frequencies varying from about 8 kilohertz to about 9 kilohertz. The re-processing of drill cuttings using the apparatus 100 can reveal impurities and mineral composition (including cementations) associated with the drill cuttings and the subterranean formation from which they were obtained.

Figure 2:
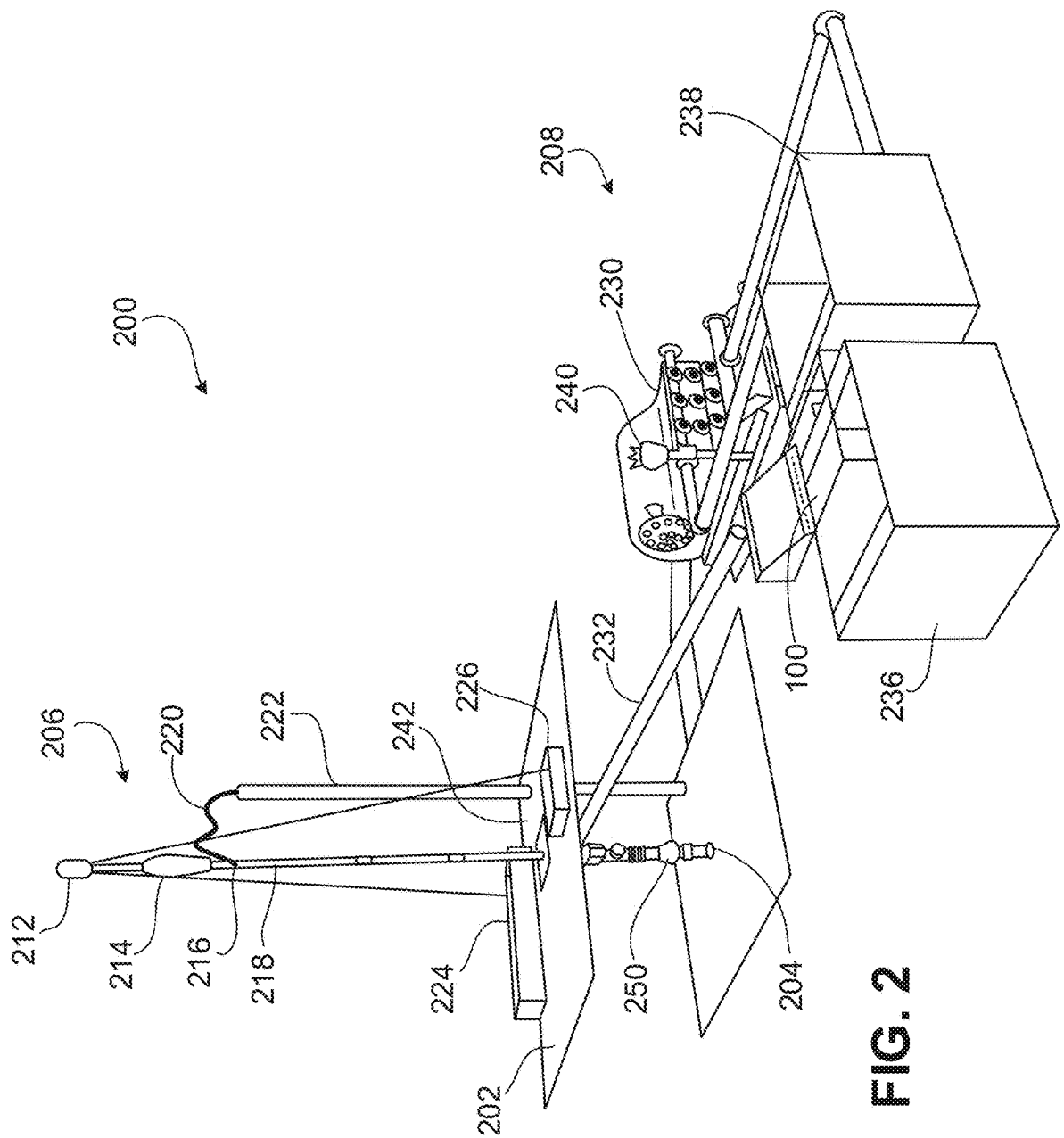
FIG. 2 is a schematic view of an example rig system for a well.

FIG. 2 is a schematic perspective view of an example rig system 200 for drilling and producing a well. The well can extend from the surface through the Earth to one or more subterranean zones of interest. The example rig system 200 includes a drill floor 202 positioned above the surface, a wellhead 204, a drill string assembly 206 supported by the rig structure, and a fluid circulation system 208 to filter used drilling fluid from the wellbore and provide clean drilling fluid to the drill string assembly 206. For example, the example rig system 200 of FIG. 2 is shown as a drill rig capable of performing a drilling operation with the rig system 200 supporting the drill string assembly 206 over a wellbore. The wellhead 204 can be used to support casing or other well components or equipment into the wellbore of the well.

The derrick or mast is a support framework mounted on the drill floor 202 and positioned over the wellbore to support the components of the drill string assembly 206 during drilling operations. A crown block 212 forms a longitudinally-fixed top of the derrick, and connects to a travelling block 214 with a drilling line including a set of wire ropes or cables. The crown block 212 and the travelling block 214 support the drill string assembly 206 via a swivel 216, a kelly 218, or a top drive system (not shown). Longitudinal movement of the travelling block 214 relative to the crown block 212 of the drill string assembly 206 acts to move the drill string assembly 206 longitudinally upward and downward. The swivel 216, connected to and hung by the travelling block 214 and a rotary hook, allows free rotation of the drill string assembly 206 and provides a connection to a kelly hose 220, which is a hose that flows drilling fluid from a drilling fluid supply of the circulation system 208 to the drill string assembly 206. A standpipe 222 mounted on the drill floor 202 guides at least a portion of the kelly hose 220 to a location proximate to the drill string assembly 206. The kelly 218 is a hexagonal device suspended from the swivel 216 and connected to a longitudinal top of the drill string assembly 206, and the kelly 218 turns with the drill string assembly 206 as the rotary table 242 of the drill string assembly turns.

In the example rig system 200 of FIG. 2, the drill string assembly 206 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 206. In some implementations, the kelly 218 and swivel 216 can be replaced by a top drive that allows the drill string assembly 206 to spin and drill. The wellhead assembly 204 can also include a drawworks 224 and a deadline anchor 226, where the drawworks 224 includes a winch that acts as a hoisting system to reel the drilling line in and out to raise and lower the drill string assembly 206 by a fast line 225. The deadline anchor 226 fixes the drilling line opposite the drawworks 224 by a deadline 227, and can measure the suspended load (or hook load) on the rotary hook. The weight on bit (WOB) can be measured when the drill bit is at the bottom of the wellbore. The wellhead assembly 204 also includes a blowout preventer 250 positioned at the surface 201 of the well and below (but often connected to) the drill floor 202. The blowout preventer 250 acts to prevent well blowouts caused by formation fluid entering the wellbore, displacing drilling fluid, and flowing to the surface at a pressure greater than atmospheric pressure. The blowout preventer 250 can close around (and in some instances, through) the drill string assembly 206 and seal off the space between the drill string and the wellbore wall.

During a drilling operation of the well, the circulation system 108 circulates drilling fluid from the wellbore to the drill string assembly 206, filters used drilling fluid from the wellbore, and provides clean drilling fluid to the drill string assembly 206. The example circulation system 208 includes a fluid pump 230 that fluidly connects to and provides drilling fluid to drill string assembly 206 via the kelly hose 220 and the standpipe 222. The circulation system 208 also includes a flow-out line 232, the shale shaker 100, a settling pit 236, and a suction pit 238. In a drilling operation, the circulation system 208 pumps drilling fluid from the surface, through the drill string assembly 206, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 206 again. The drilling fluid returns in the annulus with rock cuttings and flows out to the flow-out line 232, which connects to and provides the fluid to the shale shaker 100. The flow-out line 232 is an inclined pipe that directs the drilling fluid from the annulus to the shale shaker 100. The shale shaker 100 can include a mesh-like surface (such as the screen 104) to separate the coarse rock cuttings from the drilling fluid, and finer rock cuttings and drilling fluid then go through the settling pit 236 to the suction pit 238. The circulation system 208 includes a mud hopper 240 into which materials (for example, to provide dispersion, rapid hydration, and uniform mixing) can be introduced to the circulation system 208. The fluid pump 230 cycles the drilling fluid up the standpipe 222 through the swivel 216 and back into the drill string assembly 206 to go back into the well.

The example wellhead assembly 204 can take a variety of forms and include a number of different components. For example, the wellhead assembly 204 can include additional or different components than the example shown in FIG. 2. Similarly, the circulation system 208 can include additional or different components than the example shown in FIG. 2.

Figure 3:
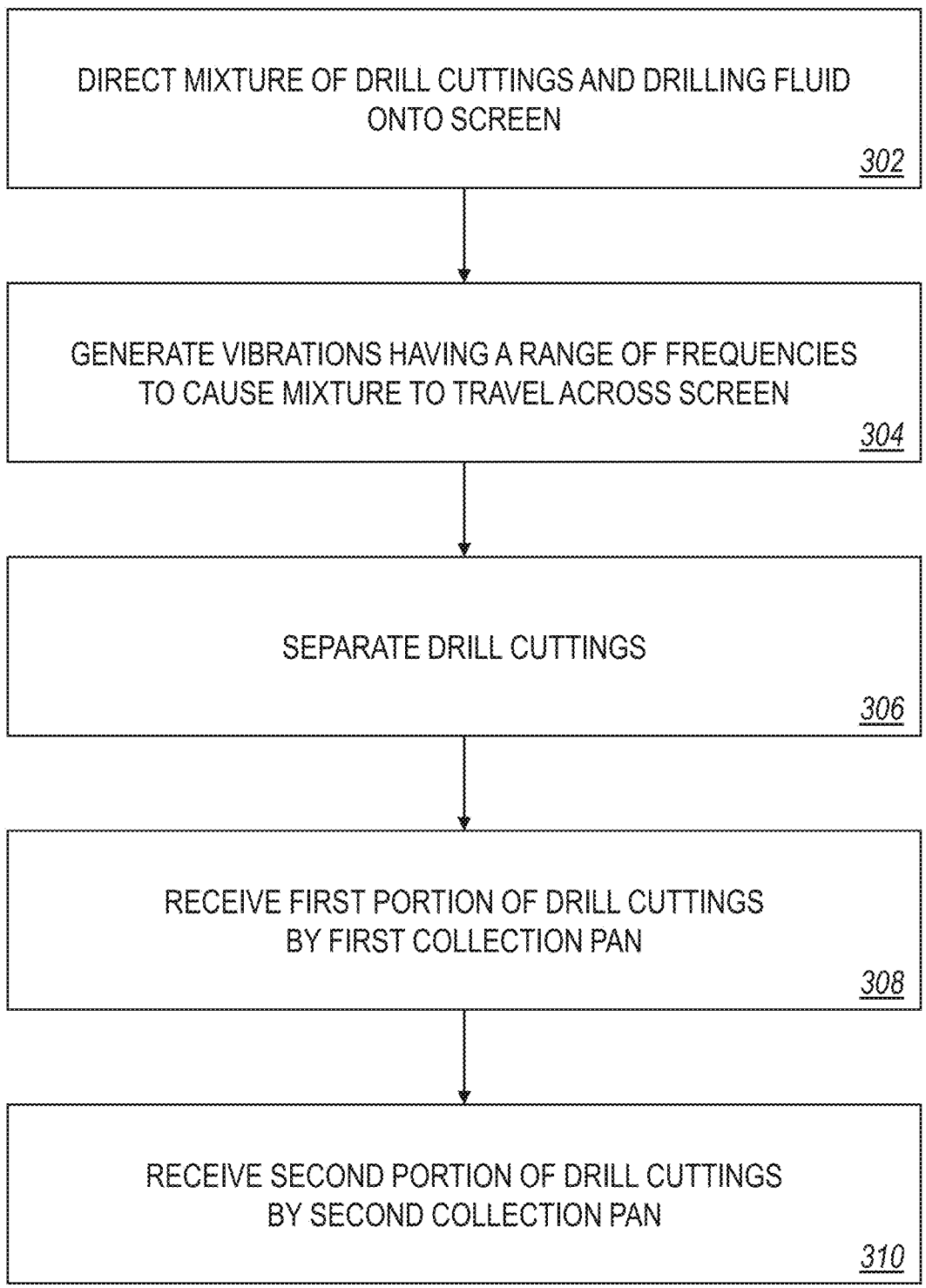
FIG. 3 is a flow chart of an example method for separating solids from a drilling fluid.

FIG. 3 is a flow chart of an example method 300 for separating solids from a drilling fluid. The rig system 200 can, for example, implement the method 300. The shale shaker 100 can, for example, be used to implement the method 300. At block 302, a mixture of drill cuttings and drilling fluid (such as the mixture 101) is directed onto a screen (such as the screen 104). The receptacle 102 positioned at the first end 104a of the screen 104 can direct the mixture 101 onto the screen 104 at block 302. At block 304, acoustic vibrations having a range of frequencies are generated. The acoustic vibrations generated at block 304 facilitate travel of the mixture 101 across the screen 104. The acoustic transducers 106 attached to the screen 104 can generate the acoustic vibrations at block 304. At block 306, the drill cuttings are separated. The acoustic vibrations generated at block 304 cause the drill cuttings to separate at block 306. For example, the acoustic transducers 106 generate acoustic vibrations of varying frequencies at block 304, which cause the drill cuttings to separate based on characteristics of the drill cuttings, such as density. At block 308, a first portion of the drill cuttings that have traveled across the screen 104 are received by a first collection pan of the collection pans 108. At block 310, a second portion of the drill cuttings that have traveled across the screen 104 are received by a second collection pan of the collection pans 108. A plate (such as one of the plates 110) can direct the first portion of the drill cuttings to the first collection pan and the second portion of the drill cuttings to the second collection pan.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain the present disclosure. Other changes, substitutions, and alterations are also possible without departing from the spirit and scope of the present disclosure.

What is claimed is:

1. An apparatus for separating drill cuttings from drilling fluid, the apparatus comprising:
    a receptacle configured to receive a mixture of the drill cuttings and the drilling fluid;
    a screen, wherein the receptacle is positioned at a first end of the screen, and the receptacle is configured to distribute the mixture of the drill cuttings and the drilling fluid across the first end of the screen, wherein the screen defines a plurality of holes sized to allow the drilling fluid to fall through the screen via the holes;
    a plurality of acoustic transducers attached to the screen, wherein each acoustic transducer is configured to generate acoustic vibrations at a different frequency, wherein the generated acoustic vibrations facilitate travel of the mixture across the screen and cause the drill cuttings themselves to separate based on density as the drill cuttings travel across the screen; and
    a plurality of collection pans configured to receive at least a portion of the drill cuttings that have traveled across the screen, wherein the plurality of collection pans are positioned at a second end of the screen opposite the receptacle, wherein the acoustic vibrations generated at different frequencies facilitate distribution of the drill cuttings across the plurality of collection pans based on density.

2. The apparatus of claim 1, wherein each acoustic transducer of the plurality of acoustic transducers is configured to generate acoustic vibrations having variable frequencies varying from 1 kilohertz to 10 gigahertz.

3. The apparatus of claim 1, wherein while operating, the collection pan is positioned below the receptacle, such that the screen extending from the receptacle to the collection pan deviates from a horizontal with respect to gravity by a degree in a range of from about 1° to about 5°.

4. The apparatus of claim 1, wherein the plurality of collection pans are distributed side-by-side across the second end of the screen for receiving the drill cuttings that have separated based on density.

5. The apparatus of claim 4, comprising, for each pair of neighboring collection pans of the plurality of collection pans, a plate positioned intermediate of the respective neighboring collection pans, each plate configured to direct different portions of the drill cuttings into the respective neighboring collection pans.

6. A method for separating drill cuttings from drilling fluid, the method comprising:
    directing, by a receptacle positioned at a first end of a screen, a mixture of the drill cuttings and the drilling fluid onto the screen;
    generating, by a plurality of acoustic transducers attached to the screen, acoustic vibrations to facilitate travel of the mixture across the screen, wherein each acoustic transducer generates acoustic vibrations at a different frequency from each other;
    separating at least a portion of the drilling fluid from the drill cuttings by allowing the portion of the drilling fluid to fall through the screen via holes defined by the screen;
    separating, by the acoustic vibrations of different frequencies generated by the plurality of acoustic transducers, the drill cuttings themselves based on density as the drill cuttings travel across the screen;
    receiving, by a first collection pan positioned at a second end of the screen opposite the receptacle, a first portion of the drill cuttings that have traveled across the screen; and
    receiving, by a second collection pan positioned at the second end of the screen opposite the receptacle, a second portion of the drill cuttings that have traveled across the screen.

7. The method of claim 6, wherein each acoustic transducer of the plurality of acoustic transducers generates acoustic vibrations having variable frequencies varying from 1 kilohertz to 10 gigahertz.

8. The method of claim 6, wherein the first and second collection pans are positioned below the receptacle, such that the screen extending from the receptacle to the first and second collection pans deviates from a horizontal with respect to gravity by a degree in a range of from about 1° to about 5°.

9. The method of claim 6, wherein the first and second collection pans are distributed side-by-side across the second end of the screen.

10. The method of claim 9, wherein a plate is positioned intermediate of the first and second collection pans.

11. The method of claim 10, comprising directing, by the plate, the first portion of the drill cuttings to the first collection pan and the second portion of the drill cuttings to the second collection pan.

12. A system comprising:
    a flow-out line configured to flow a mixture of drill cuttings and drilling fluid from a wellbore to a shale shaker; and
    the shale shaker, wherein the shale shaker comprises:
        a receptacle configured to receive the mixture of the drill cuttings and the drilling fluid from the flow-out line;
        a screen, wherein the receptacle is positioned at a first end of the screen, and the receptacle is configured to distribute the mixture of the drill cuttings and the drilling fluid across the first end of the screen, wherein the screen defines a plurality of holes sized to allow the drilling fluid to fall through the screen via the holes;
        a plurality of acoustic transducers attached to the screen, wherein each acoustic transducer is configured to generate acoustic vibrations at a different frequency, wherein the generated acoustic vibrations facilitate travel of the mixture across the screen and cause the drill cuttings themselves to separate based on density as the drill cuttings travel across the screen; and
        a plurality of collection pans positioned at a second end of the screen opposite the receptacle, wherein the plurality of collection pans are distributed side-by-side across the second end of the screen, wherein the acoustic vibrations generated at different frequencies facilitate distribution of the drill cuttings across the plurality of collection pans based on density, wherein each collection pan of the plurality of collection pans is configured to receive a different portion of the drill cuttings that have traveled across the screen.

13. The system of claim 12, wherein each acoustic transducer of the plurality of acoustic transducers is configured to generate acoustic vibrations having variable frequencies varying from 1 kilohertz to 10 gigahertz.

14. The system of claim 12, wherein while operating, the plurality of collection pans are positioned below the receptacle, such that the screen extending from the receptacle to the plurality of collection pans deviates from a horizontal with respect to gravity by a degree in a range of from about 1° to about 5°.

15. The system of claim 14, wherein the shale shaker comprises, for each pair of neighboring collection pans of the plurality of collection pans, a plate that is positioned intermediate of the respective neighboring collection pans, wherein each plate is configured to direct the different portions of the drill cuttings into the respective neighboring collection pans.

\* \* \* \* \*